April 17, 1956 R. SIFTAR 2,742,212
INFANT CARRIER
Filed March 11, 1953 2 Sheets-Sheet 1
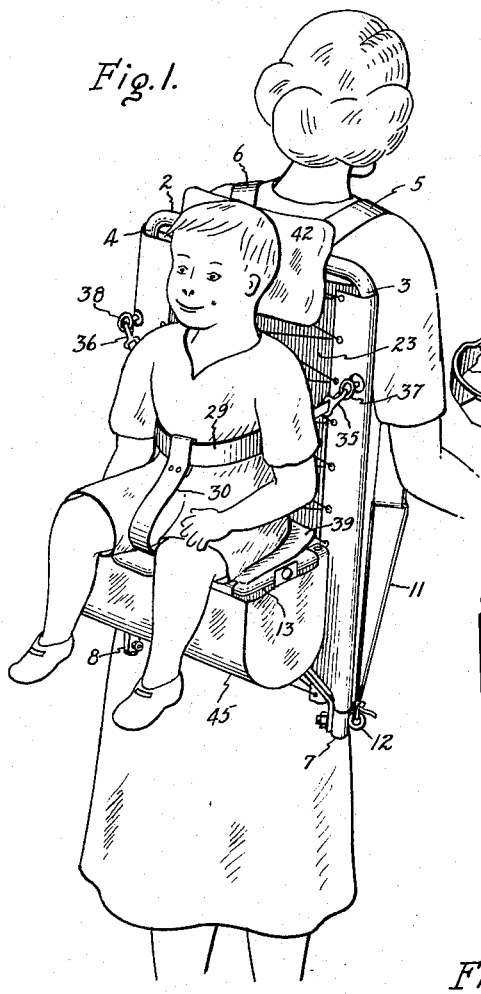
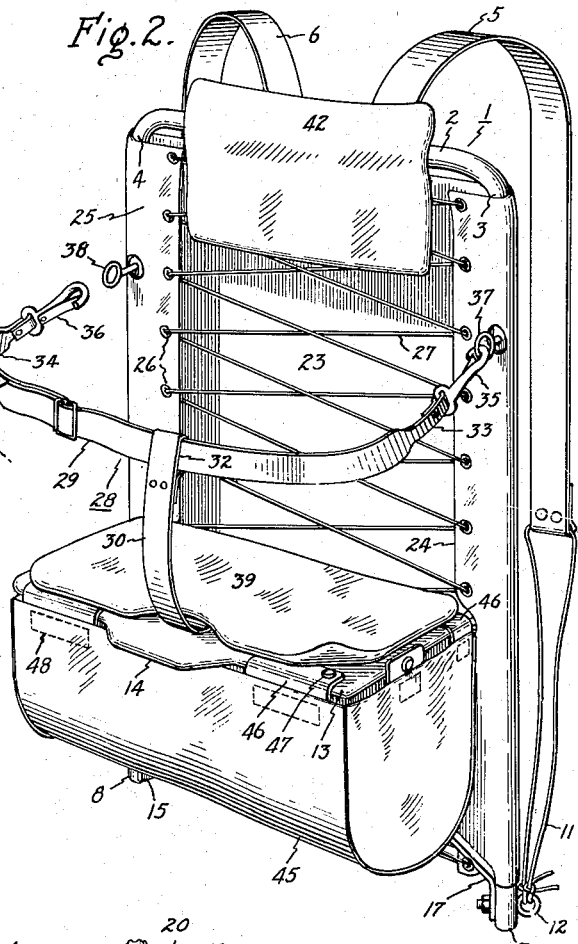
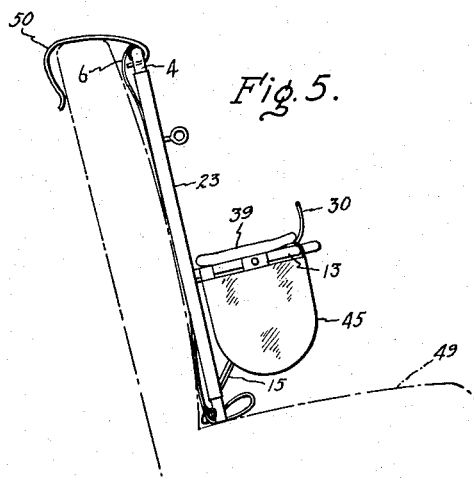
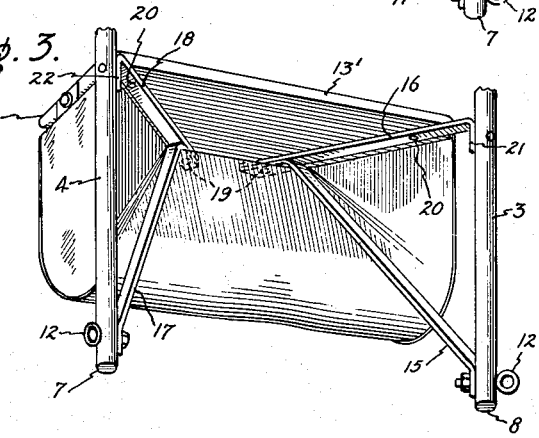
Inventor
Robert Siftar,
by Robert J. Steinmeyer
His Attorney April 17, 1956 R. SIFTAR 2,742,212
INFANT CARRIER
Filed March 11, 1953 2 Sheets-Sheet 2

Inventor
Robert Siftar,
by Robert J. Steinmeyer
His Attorney.

United States Patent Office 2,742,212
Patented Apr. 17, 1956

2,742,212
INFANT CARRIER
Robert Siftar, Schenectady, N. Y.

Application March 11, 1953, Serial No. 341,661

4 Claims. (Cl. 224—6)

The present invention relates generally to a carrying device for infants and, more specifically, to a device for carrying an infant comfortably upon the back of an adult.

The transportation of infants, particularly over rough terrain or within and about city shopping districts, is a problem which has been variously attacked but never altogether satisfactorily solved. Numerous types of vehicles for carrying infants have been utilized but vehicles are inherently awkward to handle when abrupt changes in ground level are encountered. In an attempt to avoid the difficulties presented by vehicles, several devices for carrying an infant upon the back of an adult have been proposed heretofore, however, these have not gained substantial public acceptance.

A principal object of the present invention is to provide an improved infant carrier which can be supported from the shoulders and upon the back of an adult with maximum freedom of movement and minimum fatigue for both the infant and adult.

Another object of the present invention is to provide an improved infant carrier which furnishes a means for lending a sense of security to the infant during its transportation upon the back of an adult.

Still another object of the instant invention is to provide a novel infant carrier which is adaptable for supporting an infant in a variety of locations.

A further object of this invention is to provide an improved infant carrier which is simple yet sturdy in construction, very light in weight and neat in appearance.

According to the invention, there is provided a carrying device for infants comprising a rigid substantially U-shaped frame member adapted for attachment in an inverted position along and substantially straddling the back of a person except across the shoulders by means of shoulder straps connected to the ends and the cross portion of the frame member. A strip of flexible material is secured around both of the leg portions of the substantially U-shaped frame member that are spaced apart so that only the central part of the strip of flexible material is adapted to bear aaginst the back of the person carrying the device. A rigid seat member is attached to and supported by upwardly extending braces from the lower leg portions of the rigid frame member adjacent the "small" of the person's back in a plane substantially perpendicular to the plane of the frame member, whereby the back of an infant seated upon the seat member can rest against the other side of the strip of flexible material to impart a sense of security to the infant by contact through the flexible material. The infant can be retained upon the seat member by restraining straps.

Other objects and advantages will appear in the following description of the invention, taken in connection with the accompanying drawings in which:

Fig. 1 is a perspective view of the infant carrier of the invention supported upon the back of an adult and having an infant seated in carrying position thereupon;

Fig. 2 is a complete perspective view of the device of the invention by itself;

Fig. 3 is a perspective view of a portion of the device of the invention, taken looking upwardly and from the rear with the strip of flexible material removed;

Fig. 5 is a side view illustrating how the device of the invention can be adapted as an infant automobile seat or the like.

Figure 4:
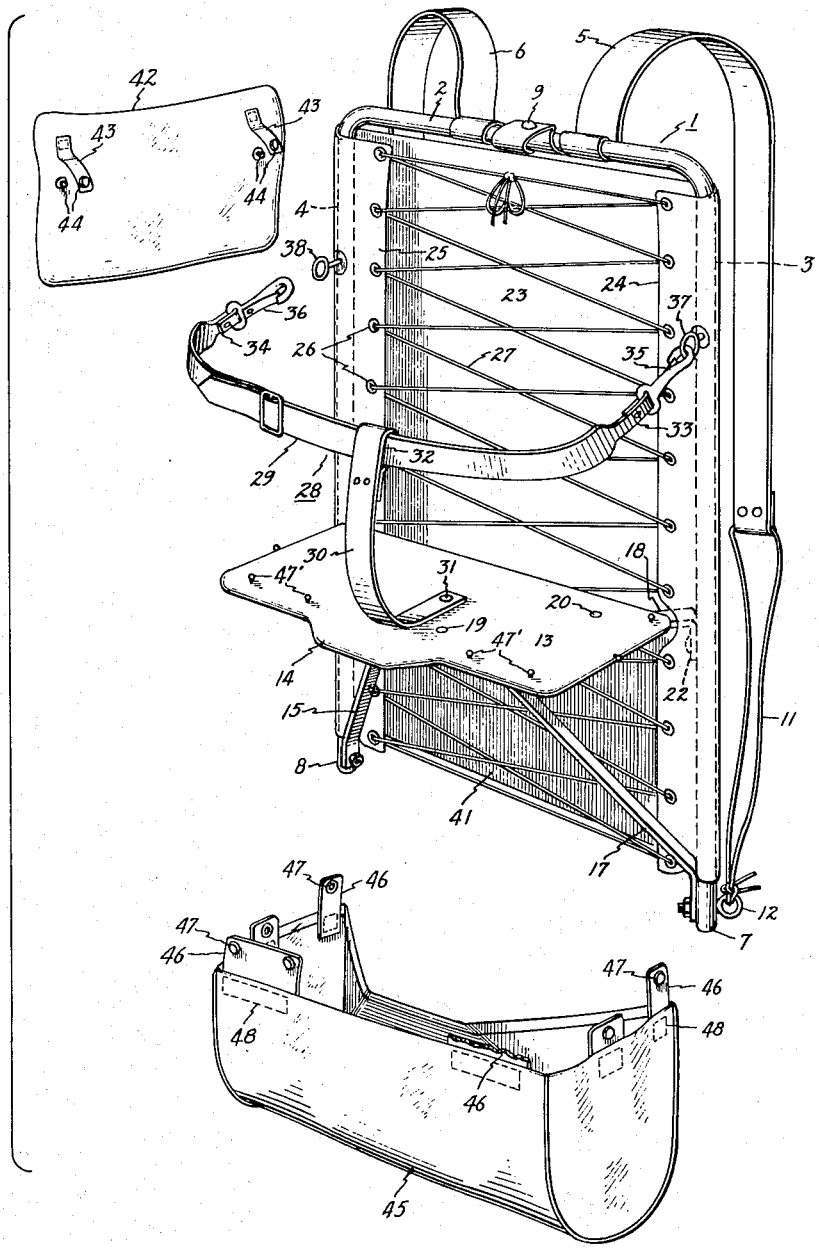
Fig. 4 is an exploded perspective view of the device of the invention showing particularly how various portions of the device may be easily detached.

Referring particularly now to the first four figures of the drawings wherein similar reference characters are utilized to identify like elements throughout, the infant carrying device of the invention comprises a rigid, substantially U-shaped frame member 1 having a cross portion 2 and leg portions 3 and 4. Preferably frame member 1 is constructed of lightweight, hollow tubular material such as aluminum or steel tubing. The substantially U-shaped frame member 1 is particularly adapted for support in an inverted position with the cross portion 2 extending across the shoulders and the spaced-apart leg portions 3 and 4 spanning the back of an adult by means of shoulder straps 5 and 6, which are attached between cross portion 2 and the ends 7 and 8 respectively of leg portions 3 and 4. The shoulder straps can be formed from a single strap of suitable material, such as woven cotton webbing, which is folded at approximately its center and attached to the middle of the cross portion 2 of frame member 1 by any effective means such as a rivet 9. The free or separated ends 10 of the shoulder straps can be provided with loops (as illustrated in Figs. 2 and 4) through which adjustable-length cords 11 are passed. Cords 11 are tied to eye-bolts 12, one of which is secured to frame member 1 near ends 7 and 8.

Attached to and supported from leg portions 3 and 4 in a plane substantially perpendicular to the plane of frame member 1 is a rigid seat member 13. It has been found that the most comfortable balance of an average infant on the back of an average adult can be obtained when these two planes intersect in a line joining substantially equally spaced points in the upper half of the lower half of each of the leg portions 3 and 4 substantially as indicated in the drawings. Seat member 13 may be contoured as shown to provide a projection 14 which aids in proper positioning of an infant thereupon. The seat member is constructed preferably of Masonite, a strong, stiff, water-resistant fiber board of the general character disclosed in U. S. Patent 1,663,504, issued to Mason on March 20, 1928, or of other suitable material, e. g., wood. Seat member 13 is attached to and supported from leg portions 3 and 4 by means of brace elements 15, 16, 17 and 18, which can also be formed from a strong, lightweight material such as aluminum. The edge 13' of seat member 13 is spaced rearwardly from the plane of frame member 1 so that it will not bear against the back of an adult carrying the device of the invention. As is clearly illustrated in Fig. 3, brace elements or struts 15 and 17 project angularly outwardly and upwardly from ends 8 and 7 respectively of frame member 1 to support brace elements 16 and 18. Struts 15 and 17 may be attached to ends 8, 7 by means of the eye-bolts 12 and to brace elements 16, 18 by any suitable means, such as rivets 19 which can also serve along with rivets 20 to secure brace members 16, 18 to seat member 13. Brace elements 16, 18 are fastened at their ends 21, 22 respectively to leg portions 4, 3.

Extending around both leg portions 3, 4 of rigid frame member 1 is a strip 23 of flexible material such as canvas. The length of the strip 23 is preferably so selected that the ends 24 and 25 are laterally positioned near the leg portions 3, 4 and the ends of seat member 13. Adjacent the ends 24 and 25 of strip 23 are a plurality of metal eyelets 26 through which a lacing 27 runs. Lacing 27 is drawn tightly enough to assure proper retention of strip 23 upon rigid frame member 1 but at the same time should not be so taut that the strip cannot conform to the back of an adult carrying the device of the invention. Moreover, sufficient slack is desired to permit an infant's back and an adult's back to contact each other through the strip when an infant is being carried as illustrated in Fig. 1. Strip 23 is provided with holes and contouring as required to adapt its fastening to frame member 1. The improved cooperating principle of the combination of structural elements of the infant carrying device of the present invention is as follows: The rigid seat member 13 together with the brace elements 15, 16, 17, 18 form a light but strong truss that is offset rearwardly from the plane of the U-shaped frame member 1. This enables the strip 23 of flexible material readily to flex through the plane of the frame into conformance with the back of the person carrying the device (without touching the seat 13) even though the seat is heavily loaded. Such flexure of strip 23 will tend to draw the ends of the leg portions 3 and 4 of the U-shaped frame member 1 toward each other. But in such case the angular thrust exerted by the outwardly and downwardly extending braces 15 and 17 from the central part of seat 13 tends to resist the forces exerted by the flexure of strip 23. These resisting forces exerted by the braces 15 and 17 will increase as the load on seat 13 increases. Consequently, the leg portions 3 and 4 of U-shaped frame member 1 will be maintained substantially parallel even with a heavy load on seat 13.

In order to retain an infant or child upon seat member 13 as shown in Fig. 1, there is provided a substantially T-shaped strap member 28 comprising an adjustable-length cross portion 29 and a leg portion 30, which also may be of adjustable length. The end 31 of leg portion 30 is attached to seat member 13 and its other end is formed into a loop 32 through which cross portion 29 extends. Cross portion 29 can extend slidably through loop 32 as shown or can be attached at approximately its center to the loop by such means as a rivet. The respective ends 33 and 34 of cross portion 29 are furnished with snaps 35 and 36 which can be fastened respectively to eye bolts 37 and 38 attached to frame member 1. Seating comfort for an infant is aided by a resilient cushion 39 positioned upon seat member 13 as shown in Fig. 2. Various means for attaching cushion 39 to seat member 30 are well known and may be utilized if deemed advantageous.

When the infant carrying device as above described is properly adjusted upon the back of an adult as illustrated in Fig. 1, the infant may be carried most comfortably and with a minimum of effort. Preferably, the adult leans his or her trunk slightly forward to compensate for the child's weight which is carried by the frame of the device. Part of the load is transmitted to the pelvic bones of the adult by means of the lower portion 41 of flexible strip 23. The shoulder straps proceed from their top attachment to the frame member of the device almost horizontally to the shoulders of the adult; this means that any vertical component of load carried by the straps is necessarily carried at their lower points of attachment to the frame of the device. Moreover, since the top horizontal portions of each shoulder strap carry the same tensile stress as the respective bottom portions, all of this force is available for holding the frame of the device securely against the adult's back, with the exception of a small amount necessary to balance the moment of the child's weight tending to produce rotation about the lower end of the frame member.

As is apparent from the foregoing description and the drawings, the child sits upon seat member 13 with its back contacting the adult's or parent's back through flexible strip 23. It has been mentioned hereinbefore that lacing 27 should not be drawn sufficiently taut to prevent such contact. This contact produces an important psychological effect upon both parent and child inasmuch as each is intimately aware of the presence and activity of the other. Mechanically, this contact means that the length of the lever arm with which the child's weight acts upon the adult's body is reduced to a minimum.

If desired, various attachments may be utilized to advantage in the device of the invention. Thus, the child's comfort may be assisted by a resilient cushion 42 removably attached to cross portion 2 of frame member 1 by means of straps 43 and snap fasteners 44. Furthermore, a bag 45 of flexible material, which may be suitably reinforced by a wire frame (not shown), can be attached to seat member 13 by means of straps 46 and snap fasteners consisting of elements 47, 47'. Straps 46 are preferably made from a material such as leather and stitched to bag 45 as illustrated at 48. Alternatively, a bag 45 may be attached to cushion 39, or extended over the cushion and secured to a portion (not shown) positioned between struts 15, 17 and strip 23.

The device of this invention is also particularly adaptable as an automobile seat for a child, as is shown in Fig. 5. In this manner of utilization the carrying device is supported upon a seat 49 by means of leg portions 3, 4 of frame member 1. A detachable spring clamp 50 securely fastens the cross portion 2 of frame member 1 to the back of the seat 49.

While this invention has been described by reference to particular embodiments thereof, it will be understood that numerous changes may be made by those skilled in the art without actually departing from the invention. For example, the strip 23 of flexible material need not be one solid strip but instead may be two strips leaving a laterally extending gap opposite the "small" of an adult wearer's back. Also, a strap that encircles the adult wearer's hips and fastens to eye bolts 12 in ends 7, 8 of frame member 1 may be used for the support of heavy children or for long periods of wear. Furthermore, other materials (e. g., wood) may be employed to construct such members as the frame and supporting struts. In any event, I aim in the appended claims to cover all such equivalent variations as come within the true spirit and scope of the foregoing disclosure.

What I claim as new and desire to secure by Letters Patent of the United States is:

1. A device for carrying an infant comprising a substantially U-shaped rigid frame member adapted for attachment in an inverted position along the back of a person, said substantially U-shaped rigid frame member including two leg portions spaced apart to span the back of a person and a cross portion joining said two leg portions, shoulder straps each secured to said cross portion of said frame member and to one of said leg portions near the free end thereof, a strip of flexible material extending around both said leg portions of said frame member to engage the central part of one side of said strip of flexible material against the back of a person carrying said device, a rigid seat member having rigid brace elements attached to and supported from said leg portions to hold said portions apart and to position the seat member in a plane substantially perpendicular to the plane of said frame member and in rearwardly spaced apart relation therewith whereby the back of an infant seated upon said seat member can rest against the other side of said strip of flexible material opposite said one side, and means for retaining an infant upon said seat member.

2. A carrying device for an infant comprising a rigid substantially U-shaped frame member adapted for attachment in an inverted position along the back of a person, said substantially U-shaped member including two parallel leg portions spaced apart to span the back of a person and a cross portion joining said two leg portions, shoulder straps each secured to said cross portion of said frame member and to one of said leg portions near the free end thereof, a strip of flexible material extending substantially coextensive with and around both said leg portions of said frame member and having its ends laced together relatively loosely to engage a substantial part of one side of said strip of flexible material against the back of a person carrying said device to conform to the contour thereof, a rigid seat member having rigid brace elements extending outwardly and downwardly therefrom and attached to and supported from said leg portions to maintain the portions apart and to position the seat member in a plane substantially perpendicular to the plane of said frame member and in rearwardly spaced apart relation therewith whereby the back of an infant seated upon said seat member can rest against the other side opposite said one side of said strip of flexible material to contact the back of the person carrying said device, and means for retaining an infant upon said seat member.

3. A carrying device for an infant comprising a rigid substantially U-shaped tubular frame member adapted for attachment in an inverted position along the back of a person, said substantially U-shaped member including two parallel leg portions spaced apart to span the back of a person and a cross portion joining said two leg portions, shoulder straps each secured to said cross portion of said frame member and to one of said leg portions near the free end thereof, a rigid seat member having rigid brace elements extending downwardly and outwardly therefrom and attached to and supported from said leg portions to maintain the portions apart and to position the seat member in a plane substantially perpendicular to the plane of said frame member and in rearwardly spaced relation therewith, said two planes intersecting at a line adjacent the "small" of a person's back and substantially above the lower points of attachment of each of said shoulder straps, a strip of flexible material extending around both said leg portions of said frame member and including a first section above said line of intersection of said two planes and a second section below said line of intersection, one side of said first section of said strip of material being adapted for bearing against the back of a person carrying said device and the other side being adapted to support the back of an infant seated upon said seat member, one side of said second section of said strip of material being adapted for bearing against the rear pelvic region of a person carrying said device, and means for retaining an infant upon said seat member.

4. A carrying device for an infant comprising a rigid substantially U-shaped frame member adapted for attachment in an inverted position along the back of a person, said substantially U-shaped member including two leg portions spaced apart to span the back and rear pelvic region of a person and a cross portion joining said two leg portions, shoulder straps each secured to said cross portion of said frame member and to one of said leg portions near the free end thereof, a rigid seat member having rigid brace elements extending downwardly and outwardly therefrom and attached to and supported from said leg portions to maintain the portions apart and position the seat member in a plane substantially perpendicular to the plane of said frame member and in rearwardly spaced relation therewith, said two planes intersecting at a line joining substantially equally spaced points in the upper half of the lower half of said leg portions, a strip of flexible material extending around both said leg portions of said frame member and including a first section above said line of intersection of said two planes and a second section below said line of intersection, one side of said first section of said strip of material being adapted for bearing against the back of a person carrying said device and the other side being adapted to support the back of an infant seated upon said seat member, one side of said second section of said strip of material being adapted for bearing against the rear pelvic region of a person carrying said device, and means for retaining an infant upon said seat member.

References Cited in the file of this patent

UNITED STATES PATENTS

| 1,641,953 | Abraham | Sept. 13, 1927 |
| 2,390,673 | Wallace | Dec. 11, 1945 |

FOREIGN PATENTS

| 123,094 | Australia | Dec. 12, 1946 |
| 960,444 | France | Oct. 24, 1949 |
| 809,583 | Germany | July 30, 1951 |